May 30, 1961

E. SCHLAUCH 2,986,432

ANTIFRICTION BEARING WITH A CASING OF PLASTIC
SYNTHETIC MATERIAL ACTING AS
ELASTIC YIELDABLE CUSHION
Filed June 19, 1957

INVENTOR

*Emil Schlauch*

By *Lowry & Rinehart*

ATTYS.

United States Patent Office 2,986,432
Patented May 30, 1961

2,986,432

ANTIFRICTION BEARING WITH A CASING OF PLASTIC SYNTHETIC MATERIAL ACTING AS ELASTIC YIELDABLE CUSHION

Emil Schlauch, Hannover-Dohren, Germany, assignor to Wilhelm Herm. Muller & Co. K.G., Hannover, Germany Filed June 19, 1957, Ser. No. 666,591

Claims priority, application Germany July 19, 1956

3 Claims. (Cl. 308—184)

The invention relates to an antifriction bearing with an elastic cushion introduced under tension between the body of the bearing and the housing thereof, which cushion consists of a casing of an oil-resistant plastic synthetic material. The use of annular, sleeve-shaped or cup-shaped cushion elements in antifriction bearings, which has been proposed on numerous occasions, has as its primary object to avoid the troublesome and in many cases objectionable running noise in antifriction bearings by insulating the irregular impulses in the rotary movement caused by the slightest inaccuracies in the manufacture of the bearings, by elastic intermediate layers so that these impulses are not transmitted to the metal parts surrounding the bearing, causing these parts to vibrate, thereby producing sound conducted through solids which is radiated as running noise.

If the cushion element is, as has also already been proposed, constructed as a casing completely surrounding the bearing body, not only the vibration will be isolated but also the radiation of noise caused by the rolling bodies rolling on the races metal against metal will be reduced. At the same time such a casing forms a well-sealed receptacle for the lubricant and protects both the antifriction bearing and the lubricant against fouling and other disadvantageous external influences. Furthermore, the elastic cushions can also constitute a factor which makes it no longer necessary to manufacture the bearings with the extremely accurate tolerances which were hitherto necessary for the fitting.

The utilization of the known advantages obtained by enclosing antifriction bearings in elastic yieldable cushion bodies has hitherto failed in practice primarily on account of the following difficulties: The casing constructed as an elastic cushion should on the one hand damp low-frequency vibrations which makes it necessary to use a synthetic material of a certain springiness; and on the other hand the elastic compressibility of the cushion must only be slight so that too great displacements of the rotating parts in relation to the stationary parts of the machine cannot occur. If the deflection of the shaft exceeds a certain tolerance, the proper rotary movement of the rotor would be disturbed, for example in the case of electric motors, and encasing the antifriction bearing would be impossible from the outset in the case of drives with heavy tooth pressure or with heavy belt or chain pull.

Until recently, no oil-resistant elastic synthetic materials with sufficiently high specific loading capacity were available which could be pressed into the bearing support with the initial stress necessary for the reasons above indicated. In the case of the previous suggestions for enclosing the antifriction bearings one has had to be satisfied with giving an elastic cushion body only a tension which was sufficient to prevent one of the raceways of the bearing from participating in the rotary movement. Such arrangements which can be described as bearing brakes are, however, only suitable for bearings subjected to light loads and would lead to the difficulties of displacement mentioned above in the case of antifriction bearings under heavy loads. Moreover, as regards the fitting of the bearing and the cushion body, it also appeared advisable to keep the initial stressing of the elastic cushion body as slight as possible.

To overcome the deficiencies of the known constructions, the present invention provides in an antifriction bearing of the type comprising a plurality of rolling bodies supported between an inner raceway and an outer raceway, a casing enclosing at least partly both of said raceways and consisting of at least one annular side wall formed integral with a cylindrical circumferential wall, said casing being made from oil-resistant plastic synthetic material with a specific loading capacity of at least 100 kgs./cm.$^2$ and adapted to be forced under heavy pressure into a support for holding the bearing in fitted position, a central aperture in the side wall of said casing for the passage of a shaft, and an annular sealing lip formed on the edge zone of said aperture and projecting towards the inner raceway, said sealing lip bearing with soft elastic pressure against the end face of said raceway extending at right-angles to the shaft.

The exceptionally firm permanent clamping of the elastic casing prevents unduly great displacement of the shaft or of the body of the antifriction bearing by the forces acting on the antifriction bearing, without detrimentally affecting the main duty of the casing, which consists in that the casing should act as vibration-damping and noise-reducing cushion.

The casing fitted under high initial stress produces a perfect sealing which completely excludes losses of lubricant and fouling of the lubricant. The sealing lip, bearing softly against the inner raceway of the antifriction bearing, does not allow any frictional wear to take place either on this lip or on the inner raceway of the bearing, as a result of which the life of the one or the other of these parts might be limited. The lip seal leads to no appreciable decrease in performance because only very slight frictional resistances can occur. The assembly of the antifriction bearing and of the casing surrounding the bearing body is no more difficult than in the case of an ordinary bearing, because the casing need not be adapted to the shaft and it is no longer necessary to keep to precision tolerances for the external diameter and the width of the body of the antifriction bearing.

Finally a casing constructed according to the invention presents the great advantage that it surrounds and seals off the antifriction bearing already before it is fitted into position and thus represents an ideal container for the despatch and storage of the antifriction bearing, which reliably prevents corrosion and fouling with dust. When the casing is a two-piece construction this effect will be attained by placing the two casing halves tightly fitting one against the other and in the case of one-piece construction of the casing by pressing a rigid cover-plate or ring into a cylindrical wall part of the casing projecting above the bearing body. Before fitting, a quantity of lubricating oil or grease is introduced in the casing and ensures perfect lubrication of the friction surfaces of the bearing for a long time ahead without attendance.

A sealing lip of a particular degree of softness can be attained by bending the edge portion of the annular side wall of the casing, which surrounds the central aperture, out of the plane of the side wall so as to form a freely movable sealing lip. For the same purpose it is advisable to make the annular side walls of the casing thinner than the circumferential wall portions surrounding the outer raceway of the antifriction bearing.

So as to enlarge the space in the casing for accommodating the lubricating liquid and to keep the rotating parts of the antifriction bearing, with the exception of the sealing lip, at a distance giving clearance from the inner surface of the annular side walls of the casing, it is suitable to provide projections at regular intervals apart on the inner surface of the annular walls, which projections serve as spacer elements or distance pieces for the outer raceway of the antifriction bearing, the greater portion of the side surface or surfaces of which lie unencumbered or exposed in the casing.

In the case of two-piece construction, the casing may, with advantage, be composed of two halves the cylindrical wall parts of which butt-joint in the symmetry plane of the antifriction bearing body. Owing to the high pressure with which the two halves of the casing are pressed together in the bearing support, leakage of the lubricant between the abutting surfaces of the two halves is reliably prevented. In addition, dividing of the casing in the manner above described presents advantages in manufacture in as far as the two casing halves can be made of identical shape with the exception of the annular side walls carrying the sealing lips.

In following up the idea of ensuring reliable lubrication of the antifriction bearing, the invention provides in the case of horizontal arrangement of the antifriction bearing, to shape the free spaces produced by the projections on the inner surface of the casing between the inner surface of the annular side wall of the casing fitted on the antifriction bearing from below, and the lower side surfaces of the body of the antifriction bearing, in such a manner that a collecting and storage chamber for the lubricant is formed, and to fit on one of the rotating parts of the antifriction bearing small feeding blades at regular intervals apart which extend downwards into the lubricant and continually feed it upwards during the rotary movement. By this means, the hitherto unsolved problem of insufficient lubrication of horizontal or substantially horizontal antifriction bearings has been solved for the first time with a minimum of technical means in a manner fully satisfying the practical requirements.

The feed blades may suitably be made of narrow sheet metal strips provided at their free end with a central longitudinal slit and tongues bent in opposite directions on the two sides of this slit and with their other end fixed on the cage of the antifriction bearing or on the inner raceway thereof by riveting, welding or in some other suitable manner.

Two preferred embodiments of the invention are illustrated by way of example in the accompanying drawing, in which.

Figure 1:
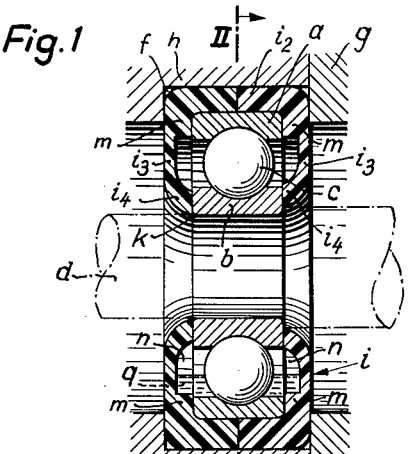
Fig. 1 is a vertical cross-section of a first form of construction taken on line I—I of Fig. 2 and showing a vertically arranged ball bearing including raceways and balls surrounded by a two-piece casing.

Referring now to the drawings, $a$ designates an outer and $b$ an inner raceway of a ball bearing of standard size and construction, $c$ designates a number of rolling bodies, for example balls arranged between the two raceways, and $d$ is a shaft on which the ball-bearing is mounted in the usual manner bearing against a shoulder on the shaft. $f$ designates the place or point of insertion in which the antifriction bearing is fitted on a bearing support $h$ which may be either divided or, as shown in Figs. 1 and 3, provided with an annular cover $g$.

Figure 3:
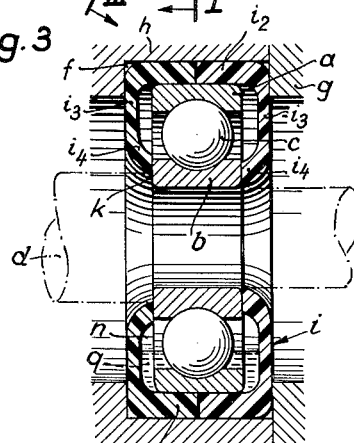
Fig. 3 is a cross-section similar to Fig. 1, but taken on line III—III of Fig. 2.

A casing $i$ inserted between the bearing support and cover $h$, $g$ and the ball bearing $a$, $b$, $c$ under tension and made of elastic synthetic material, such as polyurethane, consists in the example illustrated in Figs. 1 and 3, of two halves each of which comprises a cylindrical wall $i_2$ integral with an annular side wall $i_3$. The cylindrical wall part $i_2$ surrounding the outer wall surface of the outer raceway $a$ is of greater thickness than the side wall $i_3$ which has a circular central aperture $k$ adapted to the diameter of the shaft $d$. The side wall $i_3$ has a slightly increased wall thickness towards this central aperture $k$, and the edge zone of the wall $i_3$ bordering the central aperture $k$ is bent inwards into the interior of the casing $i$ so as to form a sealing lip $i_4$ bearing with a wide flat surface against the inner raceway $b$.

As can be seen from Figs. 1 and 3 the two-piece casing $i$ is divided in such a manner that the cylindrical wall portions $i_2$ of the two casing halves introduced under tension in the place $f$ of the bearing support $h$ between this and the annular cover $g$ butt-joint and lie tight one against the other. The sealing lips $i_4$ extend with their outer edges against the shaft $d$. As the shaft has a smaller diameter on the left-hand side than on the right-hand side of Fig. 1, the diameters of the central apertures $k$ in the annular side walls $i_3$ of the two casing halves are of different sizes. In other respects, however, the two casing halves correspond in shape and size. In the event of the difference in the diameter of the shaft in front of and behind the supporting shoulder for the ball-bearing being not too great, the two annular side walls may have central apertures $k$ of the same diameter, because the flexible material of the walls can easily compensate for slight differences.

Figure 2:
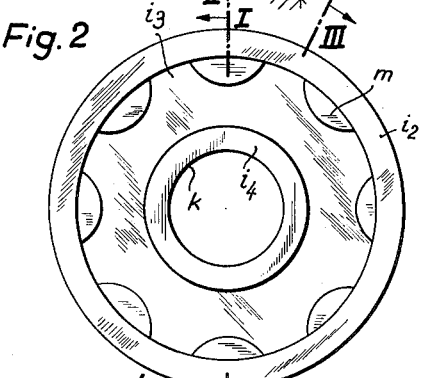
Fig. 2 is a section taken on line II—II of Fig. 1, with the raceways and balls removed.

The annular side walls $i_3$ of both casing halves $i$ are provided on their inner surface with uniformly spaced projections $m$ which extend from the outer edge of the side walls a slight distance above the surface of the side walls and, in the example illustrated in Fig. 2, are of circular segmental shape, but may be of different shape. The projections $m$ support the outer raceway $a$ of the ball-bearing at uniformly spaced points. As a result the greater part of the inner surface of the two annular side walls $i_3$ is held with free clearance from the ball-bearing $a$, $b$, $c$, so that the sealing lips $i_4$ have freedom of movement and, due to the elasticity of the material, bear with soft resiliency against the inner raceway $b$. At the same time spaces $n$ thus formed constitute a reservoir for a lubricant $q$ necessary for lubricating the rolling bodies $c$, which lubricant collects in the lower part of the casing $i$ and, as the ball bearing rotates, continually reaches all parts thereof. The above-described division of the two-piece casing $i$ and the sealing lips $i_4$ reliably prevent any loss of lubricating oil. The spaces $n$ also serve as collecting places for any particles worn off the ball bearing by abrasion.

Figure 4:
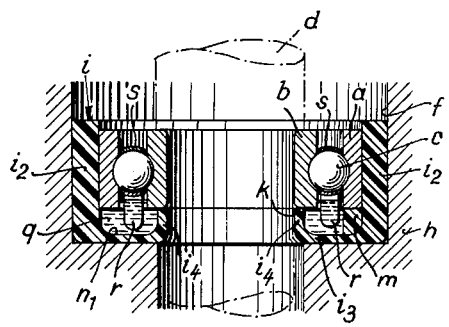
Fig. 4 is a cross-section taken on line IV—IV of Fig. 5, showing as second form of construction a horizontally mounted ball bearing encased from below.

In the case of horizontal or substantially horizontal arrangement of the antifriction bearing as shown in Fig. 4, a one-piece casing $i$ is sufficient for isolating the body of the bearing $a$, $b$, $c$ from the bearing support $h$, and the cylindrical side wall part $i_2$ of this casing is suitably made of such width that, when in fitted position slipped on to the ball bearing from below, it extends slightly beyond the upper edge of the outer raceway $a$ of the bearing, so that a disc-shaped cover $x$ may be forced into this extension to protect the bearing before it is fitted in position. The elastic casing is also fitted under initial stress in the point of insertion $f$. Also in this case a sealing lip $i_4$ is formed on the annular side wall $i_3$ around the central aperture $k$, and projections $m$ are also formed on the inner surfaces at the outer edge of the side wall for supporting and carrying the outer raceway $a$ of the ball bearing. The projections $m$ are slightly higher than in the form of construction illustrated in Figs. 1 to 3, so as to produce an enlarged collecting and storage space $n_1$ for the lubricating oil $q$ and for particles rubbed off the ball bearing by friction.

Figure 5:
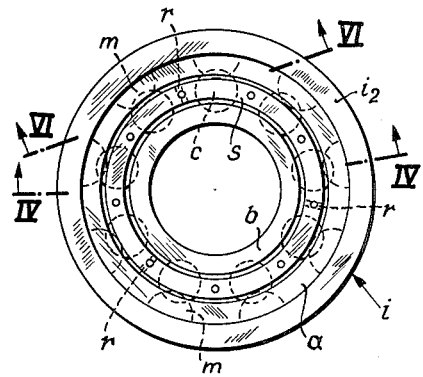
Fig. 5 is a top plan view of Fig. 4.
Figure 6:
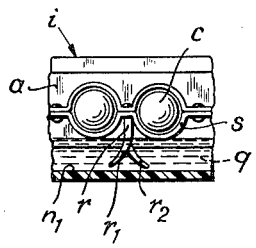
Fig. 6 is a vertical part cross-section on line VI—VI of Fig. 5.
Figure 7:
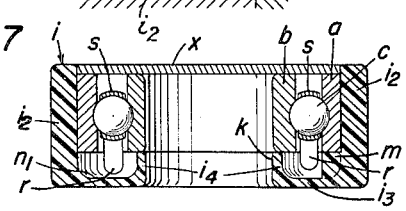
Fig. 7 is a sectional view similar to Fig. 4, showing the bearing and casing with disc-shaped protective cover thereon.

Small feed blades $r$ project into the enlarged space $n_1$ and, in the example illustrated in Figs. 4 to 6, are riveted to a ball cage $s$ of the ball bearing constructed in the usual manner, at regular intervals apart, for example displaced through an angle of 120°, namely at retracted places of the ball cage $s$ which are located between each two consecutive balls $c$. The blades $r$ consist of narrow sheet metal strips which are divided at their free end by a central longitudinal slit into two tongues $r_1$, $r_2$ which are bent in opposite directions as shown in Fig. 6. These tongues $r_1$, $r_2$, irrespective of the direction in which the ball bearing rotates, continually conduct the lubricating liquid $q$ located in the oil collecting and storage space $n_1$ under the ball bearing, to the balls $c$ and to the race surfaces on the outer and inner raceways $a$ and $b$, respectively, and thus effect an uninterrupted thorough lubrication of the ball bearing during its rotation.

The application of the invention is evidently not restricted to ball bearings but covers all other antifriction bearings, such as e.g. roller bearings, barrel-shaped roller bearings and the like.

Of course, various changes may be made in the details disclosed in the foregoing specification without departing from the invention and the claims annexed hereto.

I claim:

1. In an antifriction bearing of the type comprising a plurality of rolling bodies supported between an inner raceway and an outer raceway, a casing enclosing at least in part both of said raceways and comprising at least one annular side wall formed integrally with a cylindrical circumferential wall, said casing being made from oil resistant plastic synthetic material with a specific loading capacity of at least 100 kgs./cm.² and adapted to be forced under heavy pressure into a support for holding the bearing in a fitted position, said casing having a central aperture in the side wall thereof for the passage of a shaft, an annular axially displaceable sealing lip formed on said side wall on the zone of said aperture and projecting towards and engaging the inner raceway, said sealing lip bearing with soft elastic pressure against the end face of said inner raceway, said face extending at right angles to the shaft, said elastic casing also being made in one piece with the outer edge of the cylindrical circumferential wall extending beyond the outer raceway of the bearing whereby a disc-shaped cover can be forced within the casing to protect the bearing before it is fitted into position.

2. In an antifriction bearing of the type comprising a plurality of rolling bodies supported between an inner raceway and an outer raceway, a casing enclosing at least in part both of said raceways and comprising at least one annular side wall formed integrally with a cylindrical circumferential wall, said casing being made from oil resistant plastic synthetic material with a specific loading capacity of at least 100 kgs./cm.² and adapted to be forced under heavy pressure into a support for holding the bearings in a fitted position, said casing having a central aperture in the side wall thereof for the passage of a shaft, an annular sealing lip formed on said side wall on the edge zone of said aperture and projecting towards the inner raceway, said sealing lip bearing with soft elastic pressure against the end face of said inner raceway, said face extending at right angles to the shaft, the construction of said bearing also being such that during the horizontal disposition thereof the annular side wall of the casing fitted on the bearing from below is provided on its inner surface with projections producing free spaces below the downwardly facing side surfaces of the bearing, which spaces constitute a collecting and storage chamber for a lubricant, and small feed blades fixed on one of the rotating parts of the bearing at regular intervals and extending downwardly into the lubricant so as to constantly carry it upwardly during the rotation of the bearing.

3. In an antifriction bearing as set forth in claim 2, wherein the feed blades consist of narrow sheet metal strips each provided at its one end with a central longitudinal slit forming tongues on each side of said slit bent in opposite directions, the other end of each strip being fixed in a suitable manner to a ball cage normally provided for mounting the rolling bodies between the inner and outer raceway.

References Cited in the file of this patent

UNITED STATES PATENTS

| 1,445,821 | Buck | Feb. 20, 1923 |
| 2,173,250 | Fay | Sept. 19, 1939 |
| 2,618,520 | Anderson | Nov. 18, 1952 |
| 2,826,464 | Hawk et al. | Nov. 11, 1958 |

FOREIGN PATENTS

| 110,836 | Sweden | June 6, 1944 |
| 637,888 | Great Britain | May 31, 1950 |
| 1,086,999 | France | Aug. 18, 1954 |